(12) United States Patent
Wegmuller et al.

(10) Patent No.: US 8,441,642 B2
(45) Date of Patent: May 14, 2013

(54) COLOR MEASURING DEVICE

(75) Inventors: Mark Wegmuller, Zurich (CH); Beat Frick, Buchs (CH)

(73) Assignee: X-Rite Europe GmbH, Regensdorf (CH)

( * ) Notice: Subject to any disclaimer, the term of this patent is extended or adjusted under 35 U.S.C. 154(b) by 358 days.

(21) Appl. No.: 12/820,235

(22) Filed: Jun. 22, 2010

(65) Prior Publication Data

US 2010/0328667 A1 Dec. 30, 2010

(30) Foreign Application Priority Data

Jun. 24, 2009 (EP) .................................... 09163637

(51) Int. Cl.
*G01N 21/25* (2006.01)

(52) U.S. Cl.
USPC ........................................................ 356/420

(58) Field of Classification Search .................. 356/402, 356/420
See application file for complete search history.

(56) References Cited

U.S. PATENT DOCUMENTS

| | | | |
|---|---|---|---|
| 6,507,036 B1 | 1/2003 | Godin | |
| 6,643,022 B1 | 11/2003 | Komppa | |
| 6,707,553 B1 * | 3/2004 | Imura | 356/402 |
| 6,844,931 B2 * | 1/2005 | Ehbets | 356/328 |
| 2002/0180968 A1 | 12/2002 | Jung et al. | |
| 2003/0142314 A1 | 7/2003 | Hubble, III et al. | |
| 2006/0192963 A1 | 8/2006 | Frick | |
| 2006/0251408 A1 * | 11/2006 | Konno et al. | 348/370 |
| 2007/0103564 A1 | 5/2007 | Chiba | |
| 2008/0292295 A1 | 11/2008 | Konno et al. | |

OTHER PUBLICATIONS

European Search Report dated Apr. 1, 2010.

* cited by examiner

*Primary Examiner* — Kara E Geisel
(74) *Attorney, Agent, or Firm* — McCarter & English, LLP

(57) ABSTRACT

A color measuring device includes a lighting arrangement for a measurement field of a measurement object to be measured, a pick-up arrangement for detecting the measurement light reflected back from the measurement field and for converting it into corresponding electric signals, an electronic circuit for controlling operation of the color measuring device and for processing and evaluating the electric signals, and a display for displaying measurement results. The lighting arrangement has a lamp ring with three identical lamp groups for illuminating the measurement field from a predefined range of angles of incidence. The pick-up arrangement has a digital camera which creates an image of the measured measurement field. The electronic circuit is designed to switch the light sources of the lamp groups on sequentially, and the camera creates a separate image of the measurement field for every switched-on light source.

17 Claims, 4 Drawing Sheets

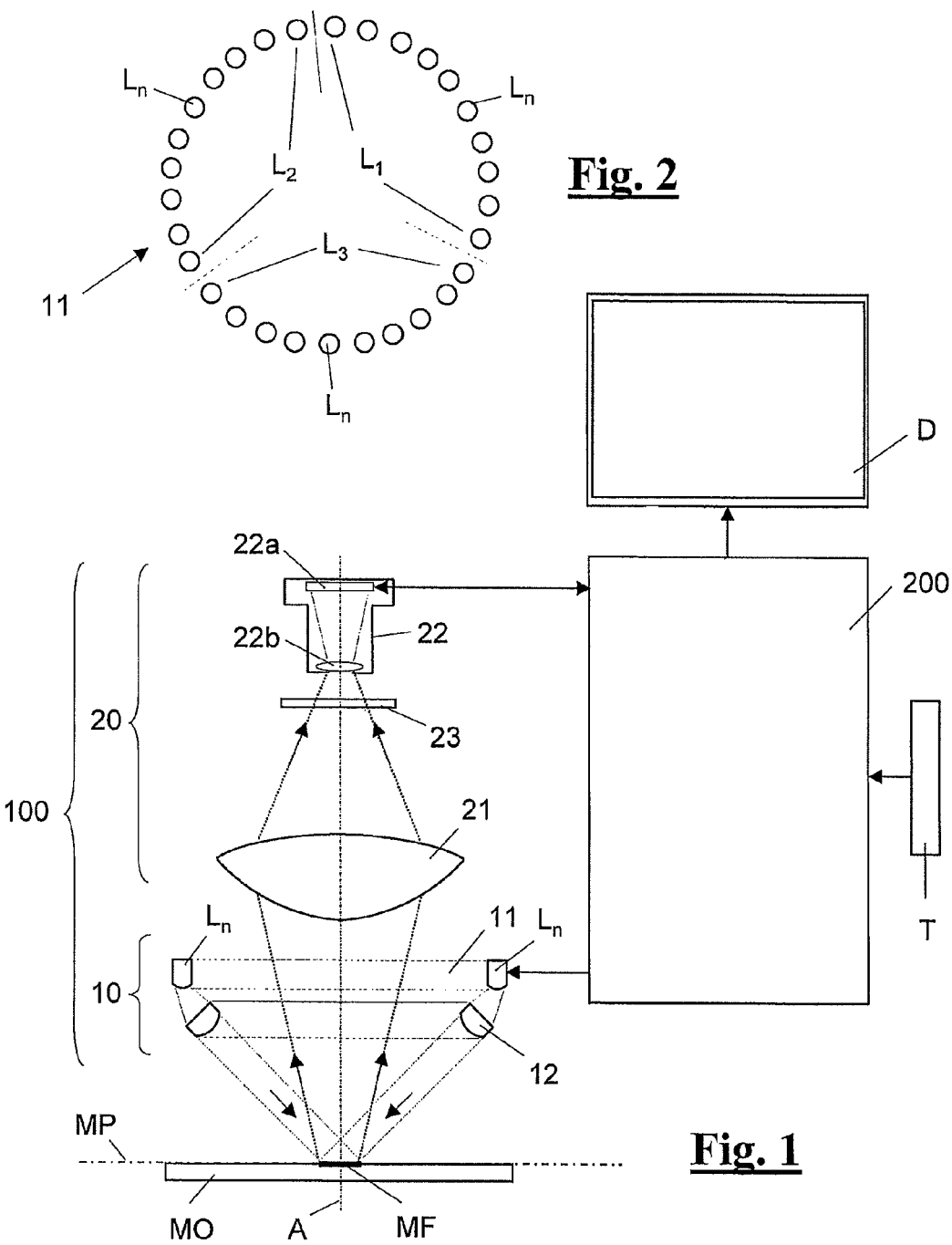
Fig. 2
Fig. 1
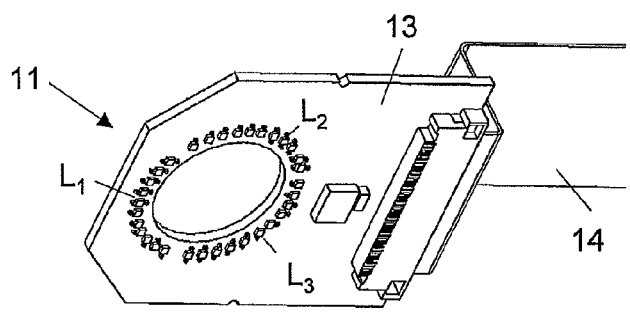
Fig. 3

COLOR MEASURING DEVICE

FIELD OF THE INVENTION

The invention relates to a device for measuring the color of a measurement field of a measurement object to be measured.

BACKGROUND OF THE INVENTION

Known color measuring devices usually contain an arrangement for illuminating the measurement object to be measured, a pick-up arrangement for detecting the measurement light reflected back from the measurement object and converting the detected measurement light into corresponding electric signals, and an electronic system for evaluating the electric signals and for controlling the operating sequence of the measuring device. The illuminating arrangement may be designed to generate white light or colored light. The converter arrangement may comprise a number of color filters or dispersive elements, e.g. a diffraction grating, for splitting the measurement light into different wavelength ranges. Photodiodes or CCD converter systems may be provided for the actual conversion into signals.

These known color measuring devices are designed for measuring flat, smooth surfaces at least in the measurement range, where they deliver satisfactory results. However, when it comes to measuring or detecting the colors of measurement objects with a structured surface (textures), these color measuring devices usually fail because the measurement results can be distorted by the surface structure of the measurement object. Depending on how pronounced the surface texture is, the illuminating light can create gloss effects and/or shadowing effects which adversely affect the measurement and lead to an incorrect color result.

Another problem arises if a measurement object has two or more colors at the measuring point of interest and the intention is to determine all the colors. This objective can not usually be achieved at all with known, conventional color measuring devices.

SUMMARY OF THE INVENTION

Against the background of the prior art, the objective of this invention is to propose a color measuring device which enables colors to be reliably determined, including in situations where the measurement object has textured surfaces. In particular, the invention is intended to propose a color measuring device which has the technical features required to enable exact color measurements to be taken on measurement objects with textured surfaces.

This underlying objective of the invention is achieved by means of a color measuring device with a lighting arrangement for a measurement field to be measured on a measurement object, a pick-up arrangement for detecting the measurement light reflected back from the measurement field and for converting it into corresponding electric signals, an electronic circuit for controlling operation of the color measuring device and processing and evaluating the electric signals, and a display for displaying measurement results, characterized in that the lighting arrangement has a lamp ring with at least three lamp groups mutually offset at an angle from one another, preferably equidistantly, around 360°, each comprising at least one light source for illuminating the measurement field at an angle of incidence within a predefined range relative to the normal onto the measurement field, and the pick-up arrangement has a photoelectric converter arrangement in the form of an imaging sensor, in particular a digital camera, which creates an image of the measured measurement field made up of image pixels, and the electronic circuit is designed to switch on the light sources of the lamp groups of the lighting arrangement selectively, and the imaging sensor generates a separate image of the measurement field for one or more individually switched-on light source(s) respectively, and forwards the associated measurement values of the individual image pixels as image data to the electronic circuit.

Based on the theoretical thinking behind the invention, the lighting arrangement has a lamp ring with three or more lamp groups mutually offset from one another at an angle, preferably equidistantly, around 360°, each comprising at least one light source for illuminating the measurement field at an angle of incidence within a defined range relative to the normal with respect to the measurement field. The pick-up arrangement has a photoelectric converter arrangement in the form of an imaging sensor, in particular a digital camera, which creates an image of the measured measurement field made up of image pixels. The electronic circuit is designed to switch the light sources of the lamp groups of the lighting arrangement on selectively, and the imaging sensor creates a separate image of the measurement field for one or more individually switched-on light source(s) and forwards the associated measurement values of the individual image pixels as image data to the electronic circuit. The measuring technique based on this design also enables measurement fields containing several colors to be measured and enables them to be illuminated from different spatial angles so that in the case of measurement fields with a textured surface, the measurement values can be subjected to additional processing for the purpose of correcting and/or eliminating the effects of interference caused by the texture.

In the case of one advantageous embodiment, every lamp group comprises a plurality of preferably 3-12 light sources with differing spectral radiation characteristics, and the light sources in all three lamp groups are of the same design and together essentially cover the visible spectral range within each lamp group respectively. In this respect, it is preferable if light sources with the same radiation characteristics are each offset at the same angle in the lamp ring. Due to the plurality of light sources with differing spectral radiation characteristics, a quasi-spectral measurement is obtained. The imaging sensor respectively the digital camera may be of a monochrome design with a local resolution of at least 100*100 pixels, which enables the use of conventional known cameras, e.g. of mobile telephones. The pick-up arrangement preferably has an aspheric lens positioned in front of the imaging sensor or digital camera, which constitutes a telecentric imaging system in conjunction with a lens of an actual sensor or the camera. This design also means that it is possible to use a commercially available camera.

It is of particular practical advantage if every lamp group has one or more UV-light sources irradiating specifically in the range of 360-400 nm. This will also enable measurement objects containing brighteners to be correctly measured.

It is of more particular advantage to use light-emitting diodes as light sources, which are preferably disposed on a common circuit board. This makes for a compact and cost-effective design of the lighting arrangement and hence the measuring unit as a whole.

In one particularly advantageous embodiment of the color measuring device proposed by the invention, the electronic circuit is designed to run a masking operation on the image data based on specific criteria, in which case image data derived from image pixels satisfying the criteria is excluded from subsequent processing. Those image pixels which have a brightness value that is higher or lower than the total image pixels of the measurement field by a threshold value or image pixels which are gloss pixels or shadow pixels are preferably masked or excluded. This already eliminates a significant amount of factors which cause interference.

The electronic circuit is advantageously designed to run a flat correction, preferably following masking, and the spatial orientation of the normal with respect to the image pixels of the measurement field are determined relative to a measurement plane, and the image data of the image pixels is corrected on the basis of the spatial orientation so that it is the same as the image data that would have been measured if the normal with respect to the relevant image pixels were perpendicular to the measurement plane and the image pixels lay in the measurement plane. This results in another compensation for the effects of interference caused by texture.

Based on another advantageous embodiment, the electronic circuit is configured so that, preferably following the flat correction, it re-computes the image data of the image pixels into color co-ordinates of a color space and determines the colors prevailing in the measurement field as a function of these color co-ordinates. To this end, the image pixels are classified on the basis of color clusters and the predominant colors are determined from the color clusters. The predominant colors can then be displayed by the electronic circuit on the display, either graphically or numerically.

BRIEF DESCRIPTION OF THE DRAWINGS

An example of an embodiment of the color measuring device proposed by the invention will be described in more detail below with reference to the appended drawings. Of the drawings:

to FIG. 1 is a schematic diagram illustrating the most important components of an exemplary color measuring device according to the present invention, FIG. 2 is a diagram illustrating the lighting arrangement of the color measuring device, FIG. 3 is a view from an angle, illustrating one practical embodiment of the lighting arrangement.

EXEMPLARY EMBODIMENTS OF THE INVENTION

Figure 9:
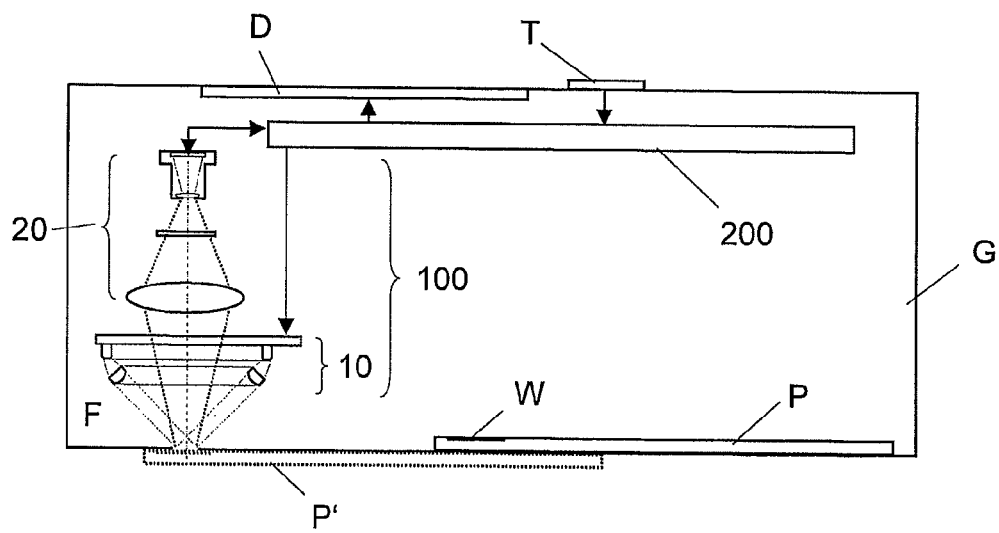
FIG. 9 is a schematic overall diagram of the color measuring device.
Figure 10:
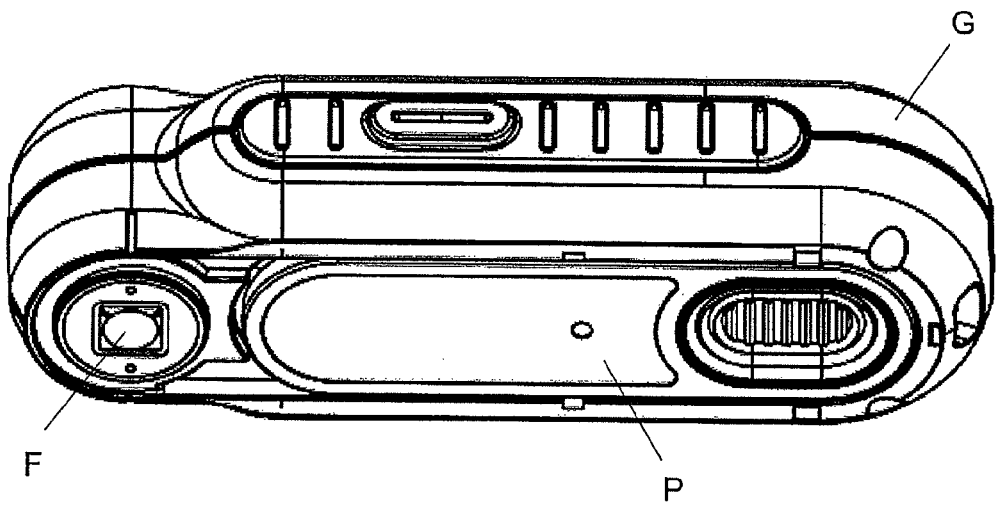
FIG. 10 is an external view of the color measuring device from an angle.

The color measuring device proposed by the invention is preferably a hand-held measuring device, and all the functional components are housed in or on an elongate, essentially rectangular housing G with rounded edges (FIG. 10). Disposed on the bottom face of the housing G is a measurement window F through which the measurement object is measured. Disposed on the top face of the housing G is a display D with graphics capability and control keys T (FIG. 9). Disposed in the interior of the housing G and overlapping the measurement window F is a measuring unit denoted as a whole by reference 100. Also disposed in the interior of the housing G is a digital, computer-based electronic circuit 200 for controlling the color measuring device and processing the measurement values (FIG. 9). The electronic circuit 200 cooperates with the measuring unit 100 and control keys T as well as the display D and contains the usual components of a digital controller, namely a processor, working, data and program memories and various interfaces for communicating with the connected functional units and input and output devices. A measuring operation can be initiated by means of the control keys T, for example, or measurement results on the display D can be controlled. The color measuring device is also equipped with an integrated white reference tile W, which is disposed on a backplate P on the housing bottom face. The white reference tile W can be positioned for calibration purposes by manually moving the backplate P in front of the measurement window F, as illustrated by the position P' of the backplate shown by broken lines.

A more detailed description of the individual components of the measuring unit 100 will be given with reference to FIGS. 1-8.

The measuring unit 100 essentially comprises two functional components, namely a lighting arrangement 10 and a pick-up arrangement 20. The lighting arrangement 10 is used to illuminate a measurement field MF on the surface of a measurement object MO at a specific angle of incidence. The pick-up arrangement 20 detects the measurement light reflected back from the measurement field MF and converts it into electric signals which are forwarded to the electronic circuit 200, where they are processed.

The lighting arrangement 10 comprises a lamp ring 11 disposed coaxially with the optical axis A of the pick-up arrangement 20 and a toroidal lens 12 disposed in front of the lamp ring on the measuring window side, likewise coaxial with the optical axis A. Instead of the toroidal lens, which increases the light yield, it would also be possible to use any other optical element or, as a minimum, an optical window. The lamp ring 11 comprises (in the example illustrated here three) identical lamp groups $L_1$, $L_2$, $L_3$ mutually offset at an angle with respect to the optical axis A (equidistantly at 120° in the example illustrated). Every lamp group comprises a number (here 10, for example) of light sources in the form of light-emitting diodes $L_n$ with differing radiation characteristics, which respectively illuminate in different spectral ranges (colors) and together essentially cover the entire visible spectral range. For practical purposes, the light-emitting diodes in the three lamp groups are of an identical design. Preferably, although not necessarily, the sequence of individual light-emitting diodes $L_n$ in each of the three lamp groups $L_1$, $L_2$, $L_3$ is identical so that light-emitting diodes with the same spectral characteristics are also positioned offset from one another at an angle equidistantly around 360°. This is illustrated in FIG. 2.

FIG. 3 illustrates a practical embodiment of the lamp ring 11. The light-emitting diodes of the three lamp groups $L_1$, $L_2$, $L_3$ are disposed on a common circuit board 13 in this instance and are connected to the electronic circuit 200 by means of a ribbon cable 14. The toroidal lens 12 is illustrated in more detail in FIG. 8.

The light emitted by the light-emitting diodes $L_n$ of the lamp ring 11 passes through the toroidal lens 12 onto the surface of the measurement object MO. The disposition is such that the measurement field MF of all the light-emitting diodes is illuminated at the same angle of incidence in the range of 30-60° (45° in the example illustrated) and as uniformly as possible. In this connection, the angle of incidence is given by reference to the normal to the measurement field, which coincides with the optical axis A of the pick-up device 20. The toroidal lens 12 is not absolutely necessary but improves the light yield of the light-emitting diodes.

Figure 6:
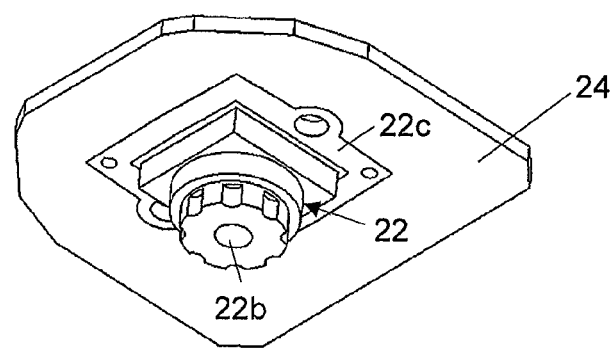
FIG. 6 is a view from an angle illustrating a practical embodiment of the pick-up arrangement of the color measuring device.

The pick-up arrangement 20 essentially comprises three components, namely a (in this example and preferably aspheric) pick-up lens 21, a monochrome (black/white) imaging sensor in the form of a digital camera 22 and (optionally) a UV cut-filter 23. The imaging sensor or digital camera 22 is a commercially available unit, such as might be used in mobile telephones for example, and in terms of functional components essentially comprises a camera chip (photoelectric converter chip) 22a and a camera lens 22b. The camera 22 also has a mounting flange 22c (FIG. 6). Hereafter, the imaging sensor will be referred to only as camera. The optical axis A of the pick-up arrangement 20 extends perpendicular to the measurement field MF of the measurement object MO. The pick-up lens 21 and the camera lens 22b together constitute a telecentric imaging system, which reproduces an image of the measurement field MF disposed in the measurement plane MP on the camera chip 22a. The camera 22 thus generates a digital image of the measurement field MF with a resolution corresponding to the camera chip 22a of typically at least 100*100 or greater, preferably approximately 200*200—approximately 640*480 image pixels (pixels). The image signals (measurement values of the individual image pixels) are forwarded to the electronic circuit 200, where they are prepared and subjected to additional processing in a manner that will be described in more detail below. It goes without saying that if using a higher resolution camera, it would also be possible for several pixels to form an image dot. The local resolution of the image pixels should preferably be at least 100*100, however.

FIG. 6 provides a slightly more detailed illustration of the digital camera 20. As illustrated, the camera 20 is attached to the bottom face of a circuit board 24 by means of its mounting flange 22c. This circuit board 24 may simultaneously also provide a mount for the electronic circuit 200 or is connected to it by lines, although these are not illustrated.

Figure 7:
FIG. 7 is a view from an angle illustrating a section through an aspheric pick-up lens of the pick-up arrangement.
Figure 8:
FIG. 8 is a view from an angle showing a section through a toroidal lens of the lighting arrangement.

The aspheric pick-up lens 21 is illustrated in more detail in FIG. 7.

Figure 4:
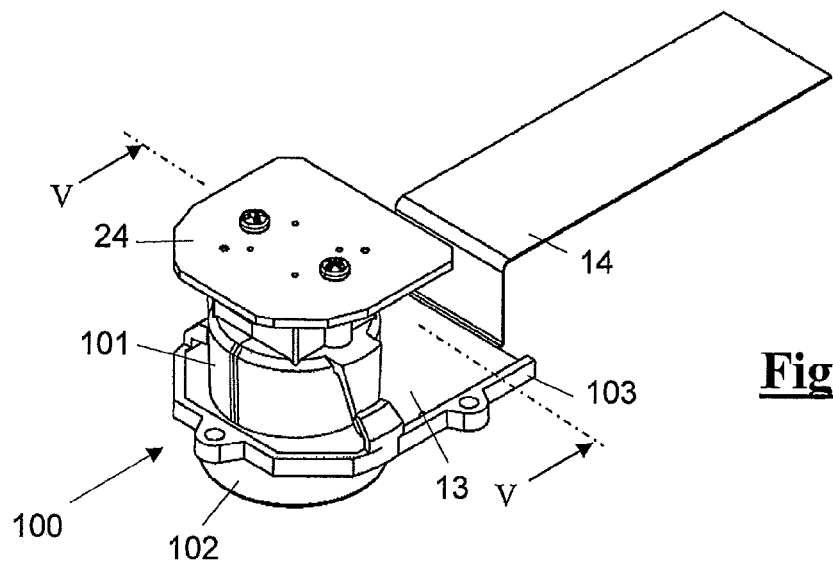
FIG. 4 is a view from an angle showing a measuring unit of the color measuring device containing the lighting arrangement and the pick-up arrangement.
Figure 5:
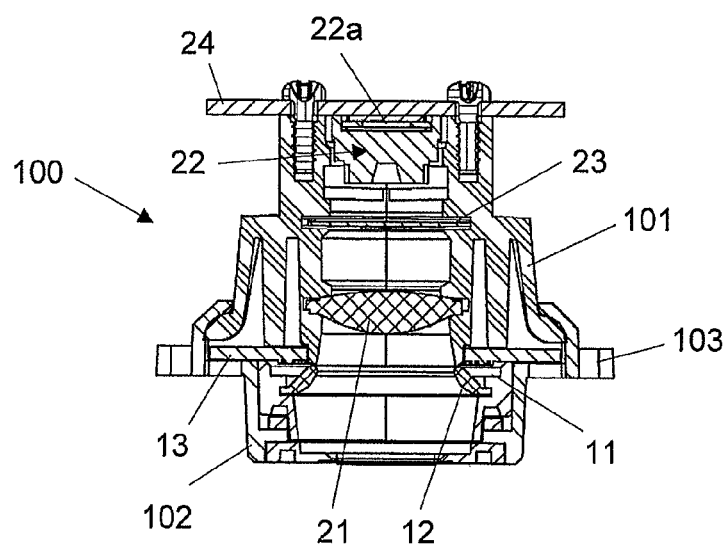
FIG. 5 shows a section through the measuring unit along line V-V indicated in FIG. 4.

The measuring unit 100 is preferably advantageously assembled with the lighting arrangement 10 and pick-up arrangement 20 to form a single physical unit. FIGS. 4 and 5 illustrate this. The measuring unit 100 comprises a housing with a top part 101 and a bottom part 102 as well as two lateral supporting bars 103. Mounted in the housing top part 101 are the digital camera 22, the pick-up lens 21 and optionally the UV cut-filter 23, whilst the housing bottom part 102 houses the lamp ring 11 with the circuit board 13 on which it is mounted and the toroidal lens 12. The circuit board 13 extends sideways out from the housing and is retained by the supporting bars 103. The measuring unit 100 is positioned in the device housing G overlapping its measurement window F so that the measurement plane MP of the measuring unit essentially coincides with the housing bottom face. If the color measuring device is placed with its housing bottom face on the measurement object MO to be measured, the measurement field MF will then be disposed exactly in the measurement plane (FIG. 1).

In the case of the embodiment of the inventive color measuring device described as an example above, there are 10 light-emitting diodes with differing radiation characteristics in each lamp group. This enables a quasi-spectral measurement of the measurement object to be obtained in 10 different spectral ranges (color channels). However, it would also be possible to provide a higher or lower number of light-emitting diodes in each lamp group, e.g. 3-12, in which case the spectral resolution will be increased or reduced accordingly. Another option is to shift the spectral resolution of the measurement light, e.g. by using a camera with color capability in the pick-up arrangement. In this case, it would only be necessary to provide a single light-emitting diode for each lamp group or more generally a light source which covers the entire spectral range of interest. Theoretically, instead of the light-emitting diodes, it would also be possible to use other light sources with corresponding radiation characteristics. In any event, it would also be possible to use a light source with a variable UV element. In the most basic form, such a light source would consist of a white light-emitting diode for the entire visible range of the spectrum from 400 nm to 700 nm and a UV light-emitting diode in the range of 360-400 nm. The use of UV light in conjunction with the visible illuminating light enables correct measurements to be taken of measurement objects containing optical brighteners for any type of illuminating light (e.g. CIE-A, D65, etc.).

One of the essential aspects of the color measuring device proposed by the invention to is the design of the lighting arrangement with the three or more lamp groups $L_1$, $L_2$, $L_3$, mutually offset at an angle, preferably equidistantly, which satisfies the measuring criteria needed to obtain a correct color measurement from textured surfaces. By means of these three or more lamp groups, the measurement object MO or measurement field MF to be measured can be illuminated from three different spatial directions and separate measurement values can be captured when illuminating from each of the three or more spatial directions. These separate measurement values for each of the spatial directions can then be taken into account or compensated by appropriate processing of structure-induced effects when measuring textured surfaces. It goes without saying that the three or more lamp groups may also be positioned in the lamp ring at different angular distances. The configuration in the drawings explained below has 3 lamp groups based on a mutual angular spacing of 120°. However, all of the explanations can be adapted to configurations based on more than 3 lamp groups and non-uniform mutual spacing without inventive input.

To run a full measuring operation on a measurement field, the light-emitting diodes of the three lamp groups $L_1$, $L_2$, $L_3$ are switched on individually in sequence by the electronic circuit 200 and a complete digital image of the measurement fields MF is captured respectively for each activated light-emitting diode. If there are 10 light-emitting diodes in each lamp group, this will result in a total of 3*10=30 images of the measurement field, representing three sets of 10 spectral representations of the measurement field respectively. For each image point resolved by the camera, therefore, there are 30 individual measurement values. If the camera 22 has a resolution of 640*480 pixels, this will correspond to 30*640*480=921600 individual measurement values. The totality of these individual measurement values constitutes the three sets of spectral representations of the measurement field, and 3 spectral representations respectively belong to one and the same spectral range but taken from three different directions of illumination.

The raw image data (3*10*640*480 individual measurement values) captured by the digital camera 22 is firstly prepared in a manner known per se prior to the actual evaluation. In preparation, a dark measurement is taken on the one hand in order to determine the dark measurement values of each individual camera pixel. On the other hand, a white measurement is taken on a non-structured white reference, and it is illuminated and measured sequentially with every individual light-emitting diode of the three lamp groups so that a white measurement value is produced as a result for every light-emitting diode and every camera pixel. The white reference may be an external element or preferably the integrated white reference tile W may be used. Preparation of the raw data then involves extracting the dark measurement value of the relevant camera pixel from each measurement value, linearizing the differential value as a function of the linearity characteristic of the camera and dividing the linearized value by the linearized white measurement value, which has also been reduced by the dark measurement value, belonging to the respective light-emitting diode and the respective camera pixel. The latter feature corrects any spatial lack of homogeneity in the illumination and differences between the individual light-emitting diodes. After these steps, prepared image data is available, which is subjected to further processing and evaluation. The terms image data and measurement values used below should be always be construed as meaning the image data or measurement values prepared as described above.

The image data may be used by the electronic circuit to display a preview image of the measurement field to be measured on the display D. To display the preview image, it may be that only some of the image data is used or a measurement could be taken using only some of the light-emitting diodes for this purpose. The preview image may be used as a means of positioning the color measuring device correctly on the measurement field and then initiating the actual measurement.

In the case of textured measurement objects, their surface is not planar. As described above, this causes interference, the effects of which can distort the measurement result. In order to compensate for the effects of interference caused by this texture, the image data is analyzed and corrected in different processing steps based on another important aspect of the invention. These processing steps are run using appropriate processing routines stored in the electronic circuit 200.

In a first processing step, the image data is masked. By this is meant that the image data from so-called "bad" image pixels (pixels) is excluded from subsequent processing. By "bad" image pixels is meant those which are not suitable for subsequent processing or would distort the sought measurement result due to their associated measurement. This process of filtering or masking the "bad" image pixels may be run on the basis of different criteria. For example, unusually bright image pixels may be excluded, the brightness of which is higher than, for example, the mean value across the entirety of all the image pixels (of the entire measured measurement field) or a part-quantity of them by a specific threshold value. Similarly, unusually dark image pixels can be excluded, the brightness of which is lower than, for example, the mean value across the entirety of all the image pixels or a part-quantity of them by a threshold value. The part-quantity might be those image pixels which lie within a set distance from the respective point of the image under consideration, for example. So-called gloss and/or shadow points of the image may also be excluded. Such a gloss or shadow image point is recognizable due to the fact that the three measurement values of the image point captured from different directions of illumination (but in the same spectral range) differ significantly. In the case of a gloss point, for example, one of the measurement values is significantly higher than the other two and in the case of a shadow point it is significantly lower. The concept of image data minus the "bad" pixels is referred to below as masked image data.

The masking step is followed by a relief analysis of the measurement field using the masked image data and a flat correction based on it. The aim of this flat correction is to compute a compensation for the inclination of the measurement points caused by the texture and the resultant distortion to the measurement value compared with non-inclined, plane parallel measurement points. Also compensated are the effects of interference caused by different vertical positions of the individual image pixels from the measurement plane.

For the purpose of this flat correction, the spatial orientation of the surface of each measurement point relative to the measurement plane is determined from its three measurement values obtained from three different directions of illumination (but in the same spectral range). In this respect, the spatial orientation is expressed by the direction of the normal vector onto the surface of the measurement point. Using the spatial orientation of the measurement point expressed by the normal vector, the three measurement values are then corrected so that they correspond to those measurement values which would have been obtained if the relevant measurement point were to lie in the measurement plane and the surface of the measurement point was therefore more or less "flat", i.e. not inclined with respect to the measurement plane.

The flat correction will be explained below with reference to FIG. 11, which shows a highly exaggerated representation of the measurement object MO with an individual measurement point $P_M$ as well as a representation of the white reference W with a corresponding measurement point $P_W$. A co-ordinate cross KK indicates the spatial conditions under which the measurement point is illuminated. The measurement plane MP extends parallel with the plane spanning the x and y axis of the co-ordinate cross and the optical axis of the pick-up arrangement is parallel with the z axis of the co-ordinate cross. The lamp ring 11 of the lighting arrangement, which is merely indicated by a line, lies at a distance z above the measurement plane MP and parallel with it. The angle of incidence of the illuminating light relative to the optical axis is denoted by α. As may be seen, the surface of the measurement point $P_M$ is inclined at an angle to the measurement plane due to the surface texture of the measurement object, i.e. the normal or normal vector $vN_s$ onto the measurement object in the region of the measurement point is not perpendicular to the measurement plane MP but sits somewhat "offset" in space. The measurement point is illuminated by one of the light-emitting diodes $L_n$, and the distance between the light-emitting diode and measurement point is show as illumination vector $vr_s$ in the drawing and is made up of the three spatial components $r_{xs}$, $r_{ys}$, and $r_{zs}$. Component $r_{zs}$ is identical for all light-emitting diodes $L_n$ in terms of the distance between the measurement point $P_M$ and lamp ring 11, whilst components $r_{xs}$ and $r_{ys}$ depend on the position of the light-emitting diode in the lamp ring and the position of the image point $P_M$ in the measurement field. The same applies to the white reference W shown for clarity, which in reality takes the place of the measurement object. Since the white reference W is planar in principle and is disposed in the measurement plane MP, the normal vector $vN_w$ for each measurement point $P_W$ of the white reference is perpendicular to the measurement plane. The illumination vector between the light-emitting diode $L_n$ and the measurement point $P_W$ onto the white reference is denoted by $vr_w$ and its z component by $r_{zw}$.

The following explanations apply to all the all measurement points of the measurement field and to all color channels, i.e. to the different spectral ranges of the illuminating light (e.g. 10 in the case of the embodiment described as an example above).

During measurement, each measurement point is sequentially illuminated by three light-emitting diodes of the same color (spectral radiation characteristic) from three mutually offset (by 120°) spatial directions respectively. This results in three measurement values which are used for the subsequent computations.

The following formula is applied to obtain the radiation density factor 1 of an image point measured by the camera and prepared in the manner described above and normalized to the white reference, based on a sample and a white reference with a Lambert's reflection characteristic $$l = \frac{E_s * R_s}{E_w * R_w} \quad \text{(Formula 1)}$$

In the above, $E_s$ and $E_w$ stand for the radiation intensities of the image point of the measurement object or white reference and $R_s$ and $R_w$ stand for the coefficient of reflection of the image point of the measurement object or white reference.

Figure 11:
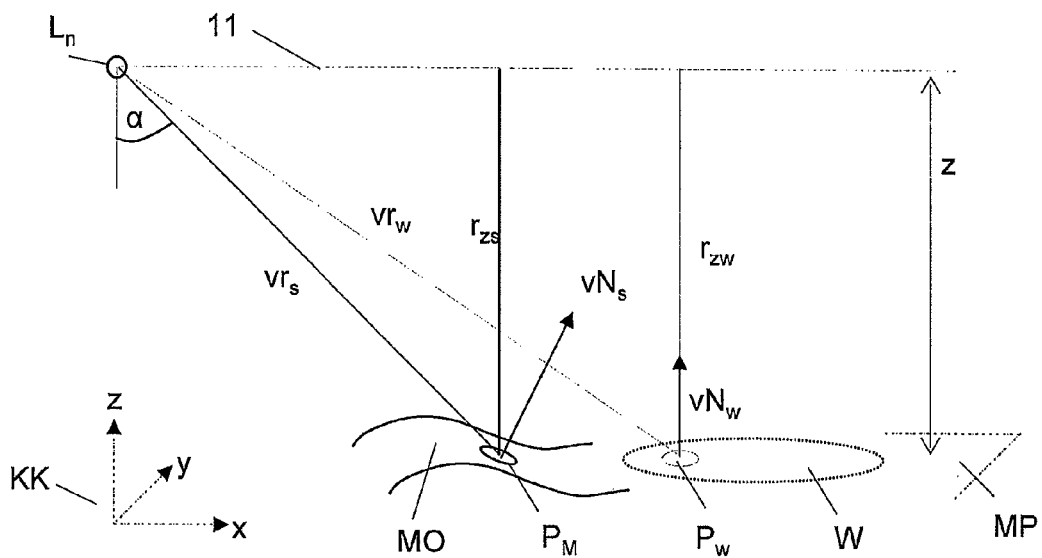
FIG. 11 is a diagram illustrating the step whereby a measurement value is corrected and FIG. 12 is a block diagram illustrating how the measurement data is processed and evaluated.
Figure 12:
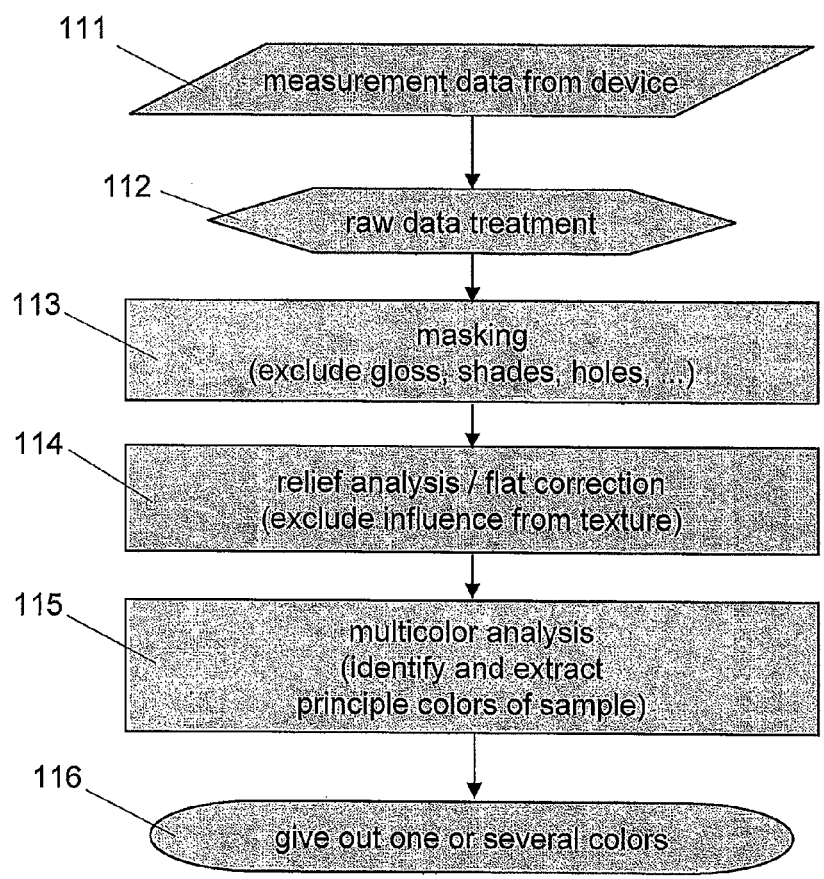

With the lighting configuration illustrated in FIG. 11 and assuming that the light-emitting diodes have a Lambert's radiation characteristic, the following applies to the measurement object $$E_s = I_0 * \frac{r_{zs}}{r_s} * \frac{(vN_s * vr_s)}{r_s^3} = I_0 * r_{zs} * \frac{(vN_s * vr_s)}{r_s^4} \quad \text{(Formula 2)}$$

In the above, $E_s$ stands for the lighting intensity at the measurement point $P_M$ of the measurement object, $I_0$ stands for the peak radiation intensity of the light-emitting diode, $vN_s$ stands for the normal vector onto the measurement point, $vr_s$ stands for the illumination vector, $r_{zs}$ stands for the z component of the illumination vector and $r_s$ stands for the amount (length) of the illuminating vector.

The same applies to the measurement of the white reference using the same measurement configuration $$E_w = I_0 * \frac{r_{zw}}{r_w} * \frac{(vN_w * vr_w)}{r_w^3} = I_0 * r_{zw} * \frac{(vN_w * vr_w)}{r_w^4} \quad \text{(Formula 3)}$$

In the above, $E_w$ stands for the radiation intensity at the measurement point $P_W$ of the white reference, $I_0$ stands for the peak radiation intensity of the light-emitting diode, $vN_w$ stands for the normal vector onto the measurement point of the white reference, $vr_w$ stands for the illumination vector, $r_{zw}$ stands for the z component of the illumination vector and $r_w$ stands for the amount (length) of the illumination vector.

By incorporating formulas 2 and 3 in formula 1, given that, in the case of a non-structured white reference positioned in the measurement plane, the normal vector $vN_w$ extends perpendicular to the measurement plane, the following equation is obtained:

$$l = \frac{r_{zs} * \frac{(vN_s * vr_s)}{r_s^4} * R_s}{r_{zw}^2 * \frac{1}{r_w^4} * R_w} \quad \text{(Formula 4)}$$

The situation where illumination is provided by three light-emitting diodes from three different spatial directions can be expressed by the following matrix equation:

$$\begin{pmatrix} l_1 \\ l_2 \\ l_3 \end{pmatrix} = \begin{bmatrix} v_1 r_{xs1} & v_1 r_{ys1} & v_1 r_{zs1} \\ v_2 r_{xs2} & v_2 r_{ys2} & v_2 r_{zs2} \\ v_3 r_{xs3} & v_3 r_{ys3} & v_3 r_{zs3} \end{bmatrix} * \begin{pmatrix} N_{xs} \\ N_{ys} \\ N_{zs} \end{pmatrix} * \frac{R_s}{R_w} \quad \text{(Formula 5)}$$

In the above, $v_i = (r_w^4 * r_{zs})/(r_{si}^4 * r_{zw}^2)$ where $i = 1, 2, 3$ corresponding to the three light-emitting diodes.

Formula 5 can be expressed more compactly as follows:

$$\begin{pmatrix} l_1 \\ l_2 \\ l_3 \end{pmatrix} = [M] * vN_s * l_F \quad \text{(Formula 6)}$$

This matrix equation can be resolved on the basis of the variables of interest, normal vector $vN_s$ and its norm $l_F$:

$$vN_s * l_F = [M]^{-1} * \begin{pmatrix} l_1 \\ l_2 \\ l_3 \end{pmatrix} \quad \text{(Formula 7)}$$

The variable $l_F$ in this instance is the radiation density factor normalized to the white reference which would be measured in the case of a flat image point in the measurement plane, in other words the sought "flat corrected" measurement value.

In the equation based on formula 7, all the variables on the right-hand side are known except for the three z-components $r_{zs1}$-$r_{zs3}$ of the illumination vectors $vr_{s1}$-$vr_{s3}$. Since the light-emitting diodes lie in a plane parallel with the measurement plane, these three z-components are of equal value. The value of the z component depends on the structure-depth of the measurement field, i.e. the depth $\Delta z$ of the respective measurement point $P_M$ from the measurement plane MP. It has been found that by simulation, the "flat correction" can be run with a sufficient degree of accuracy by opting for a standard mean depth $\Delta z$ for all the measurement points of the measurement field so that $r_{zs1} = r_{zs2} = r_{zs3} = z + \Delta z$ applies to the z components of all image pixels, where z represents the distance of the lamp ring from the measurement plane.

The mean depth $\Delta z$ may be calculated from the measurement data in various ways. One option, for example, is to run the flat correction with different fixed values for $\Delta z$ (e.g. 0 mm, 0.3 mm, 0.6 mm, ... ) and analyze the standard variance of the "flat corrected" measurement values $l_F$ as a function of $\Delta z$. The optimum value for the $\Delta z$ can then be derived from the minimum of the standard variance.

Naturally, it is sufficient to have apply light and produce only one set of image data from at least three different spatial directions in the same spectral range as a minimum in order to determine the spatial orientation of the surface relative to the measurement plane. The at least two other sets of image data of other color channels needed to obtain the spectral characterization of the sample could also be obtained by simultaneously activating the light sources of all lamp groups irradiating in a respective spectral range, or alternatively, only one lamp group could be fitted with the corresponding light sources. Another option would be to generate only one image by individually switching on several light sources. The flat correction or "flat computation" of such "incomplete sets of image data" (in which image data is available from less than 3 spatial directions in each case) is then run simply on the basis of general optical principles, knowing the normal vector and the position of the image elements and light sources.

After this flat correction, there is then a number of more or less narrowband, flat corrected ("flat computed") measurement values for each point, this number corresponding to the number of different light-emitting diodes per lamp group, which form the basis for subsequent processing.

The next step is a color analysis of the image data or measurement values masked and flat corrected as described above. The purpose of this color analysis is to pinpoint all the dominant colors which occur in the measurement field. By dominant colors is meant those which predominantly occur in the measurement field. Individual "outriders" and artifacts should be left out of the analysis.

To this end, the (flat corrected) measurement values of the individual image pixels are firstly converted in to XYZ color values. This is done in a known manner by multiplying the measurement values of the color channels (in this instance 10, for example) by a calibration matrix determined by a calibration system of the device, the dimension of which will be 3*10 for 10 color channels, for example. The XYZ color values of the individual image pixels are then re-computed in a manner known per se (using CIE calculation formulae) to obtain color co-ordinates of a color space, preferably the L,a,b color space. The color of every image point is then defined by the corresponding color co-ordinates. Color clusters are then formed and analyzed on the basis of their spatial distribution and their color differences, for example, in order to determine which are the dominant colors.

The cluster imaging may be run by mean of the frequency distribution method, for example, or by the method of so-called "k-means clustering" (see Wikipedia, k-means clustering, for example). In the case of the latter method, starting from a larger number of (initially unpopulated) clusters each defined by an initial mean color (color co-ordinates of the mean colors), the image pixels are respectively assigned to the cluster whose mean color is the color of the image point disposed the shortest distance away. On this basis, the mean colors of the cluster are re-defined, for example by averaging the color co-ordinates of the respective image pixels contained in the clusters and re-assigning the image pixels. This is repeated until the clusters no longer change or do so only marginally.

The color clusters populated in this manner can be analyzed in the following manner, for example. The color distances $\Delta E=(\Delta L^2+\Delta a^2+\Delta b^2)^{0.5}$ between the mean colors of the individual color clusters are calculated. If the shortest calculated color distance is shorter than a predefined threshold value (e.g. $\Delta E=5$), the two color clusters in question are combined to form a new color cluster and the two original clusters are deleted. This process is repeated until the shortest computed color distance is bigger than the threshold value. The size of the remaining or newly formed color cluster is then determined. The size may be measured as a proportion by percentage of image pixels per cluster relative to the total number of image pixels of all the clusters. The dominant colors are then defined as being the mean colors of those color clusters whose size is above a fixed minimum value (e.g. 10%).

The final step is the display of the desired measurement results on the display D. In this respect, the color co-ordinates of the resultant dominant colors may be displayed numerically. Another option is to display the measured measurement field containing the colors of the individual image pixels resulting from the computed color coordinates in a graphic format. It is also possible to display only those image pixels of the measurement field which contain one of the resultant dominant colors. Yet another option is to select a specific point on the displayed image of the measurement field using the control keys and prompt a display of the relevant colors based on numbers. Other display options would also be conceivable.

FIG. 11 summarizes the steps involved in processing the measurement values described above in the form of a block diagram to provide an overall view. Block 111 denotes detection of the (raw) image data by the camera. Block 112 represents the step of preparing the raw image data. Block 113 shows the masking step. In Block 114, the relief analysis and the flat correction are run. Block 115 represents the color analysis and block 116 represents the output of measurement data.

It goes without saying that the sequence of the individual processing steps (masking, flat correction, determining the dominant colors) may also be varied and these processing steps may also be totally or partially omitted, depending on the intended purpose of the color measuring device.

The invention claimed is:

1. A color measuring device, comprising:
 a. a lighting arrangement for a measurement field of a measurement object to be measured,
 b. a pick-up arrangement for detecting the measurement light reflected back from the measurement field and converting it into corresponding electric signals,
 c. an electronic circuit for controlling operation of the color measuring device and processing and evaluating the electric signals, and
 d. a display for displaying measurement results,
  wherein the lighting arrangement comprises a lamp ring with at least three lamp groups mutually offset at an angle around 360°, each of said lamp groups with at least one light source for illuminating the measurement field from a predefined range of angles of incidence relative to the normal onto the measurement field,
  wherein the pick-up arrangement has a photoelectric converter arrangement in the form of an imaging sensor which creates an image of the measured measurement field made up of image pixels, and the electronic circuit is designed to switch on the light sources of the lamp groups of the lighting arrangement selectively,
  wherein the imaging sensor creates a separate image of the measurement field for one or more individually switched-on light sources, respectively, and forwards the measurement values of the individual image pixels associated with different lighting directions to the electronic circuit as image data, and
  wherein the electronic circuit is designed to run a flat correction in order to compensate for interference effects induced by texture, and a spatial orientation of the normal onto the image pixels of the measurement field relative to a measurement plane is determined from the measurement values of the different lighting directions, and the spatial orientation is applied as a means of correcting the image data of the image pixels so that they are identical to the image data that would have been measured had the normal onto the relevant image pixels been perpendicular to the measurement plane and the image pixels had lain in the measurement plane.

2. The color measuring device according to claim 1, wherein every lamp group has a plurality of 3-12 light sources with differing spectral radiation characteristics, and the light sources in all three lamp groups are of the same type and each lamp group as a whole essentially covers the visible spectral range in each case.

3. The color measuring device according to claim 2, wherein three light sources with the same radiation characteristics are respectively disposed offset in the lamp ring by the same angle of about 120°.

4. The color measuring device according to claim 1, wherein at least one of the lamp groups has one or more UV-light sources radiating in the range of 360-400 nm.

5. The color measuring device according to claim 1, wherein the light sources are provided in the form of light-emitting diodes disposed on a common circuit board.

6. The color measuring device according to claim 1, wherein the imaging sensor is of a monochrome design and has a local resolution of at least 100*100 pixels.

7. The color measuring device according to claim 1, wherein the pick-up arrangement has a lens disposed in front of an imaging sensor lens, which forms a telecentric imaging system in conjunction with the imaging sensor lens provided in the imaging sensor.

8. The color measuring device according to claim 1, wherein the electronic circuit is designed to run a process of masking the image data on the basis of predefined criteria, and the image data of those image pixels which satisfy the predefined criteria is excluded from subsequent processing.

9. The color measuring device according to claim 8, wherein, during masking, the electronic circuit is designed to exclude from subsequent processing the image data of those image pixels which have a brightness value higher or lower than all of the image pixels of the measurement field or a part-quantity thereof.

10. The color measuring device according to claim 8, wherein, during masking, the electronic circuit is designed to exclude the image data of gloss or shadow points from subsequent processing.

11. The color measuring device according to claim 1, wherein the electronic circuit is designed to re-compute the image data of the image pixels to obtain color coordinates of a color space and determine the predominant colors in the measurement field on the basis of the color coordinates.

12. The color measuring device according to claim 11, wherein the electronic circuit is designed to classify the image pixels on the basis of color clusters and determine the predominant colors from the color clusters.

13. The color measuring device according to claim 11, wherein the electronic circuit is designed to output the predominant colors on the display in one or more of graphical and numerical forms.

14. The color measuring device according to claim 1, wherein the electronic circuit is designed to display an image of the measurement field graphically on the display.

15. The color measuring device according to claim 1, wherein the at least three lamp groups are equidistantly offset.

16. The color measuring device according to claim 1, wherein the imaging sensor is a digital camera.

17. The color measuring device according to claim 1, wherein the imaging sensor is of a monochrome design and has a local resolution of between about 200*200 and 640*480 pixels.

\* \* \* \* \*